(12) United States Patent
Patel et al.

(10) Patent No.: US 9,973,891 B2
(45) Date of Patent: May 15, 2018

(54) SYSTEM AND METHOD FOR GEOFENCING

(71) Applicant: Kodiak Networks Inc., Plano, TX (US)

(72) Inventors: Krishnakant M Patel, Richardson, TX (US); Debabrata Dash, Richardson, TX (US); Ravi Ayyasamy, Richardson, TX (US); Pratap Chandana, Plano, TX (US); Bharat Ram Setti, Plano, TX (US); Sayyad Gaffar, Bengaluru (IN); Rohit Ashok Nerlikar, Richardson, TX (US); Ramu Kandula, Plano, TX (US)

(73) Assignee: KODIAK NETWORKS INC., Plano, TX (US)

( * ) Notice: Subject to any disclaimer, the term of this patent is extended or adjusted under 35 U.S.C. 154(b) by 0 days. days.

(21) Appl. No.: 15/331,559

(22) Filed: Oct. 21, 2016

(65) Prior Publication Data

US 2017/0118592 A1    Apr. 27, 2017

Related U.S. Application Data

(60) Provisional application No. 62/245,876, filed on Oct. 23, 2015.

(51) Int. Cl.
*H04W 24/00* (2009.01)
*H04W 4/02* (2018.01)
*H04W 4/06* (2009.01)
*H04W 64/00* (2009.01)
*G06F 17/30* (2006.01)

(52) U.S. Cl.
CPC ...... *H04W 4/021* (2013.01); *G06F 17/30241* (2013.01); *H04W 4/022* (2013.01); *H04W 4/023* (2013.01); *H04W 4/027* (2013.01); *H04W 4/06* (2013.01); *H04W 64/006* (2013.01)

(58) Field of Classification Search
CPC . G06F 17/30241; H04W 4/021; H04W 4/022; H04W 4/027; H04W 4/06; H04W 64/006
USPC ...................................... 455/456.1
See application file for complete search history.

(56) References Cited

U.S. PATENT DOCUMENTS

| | | | |
|---|---|---|---|
| 6,643,669 B1 | 11/2003 | Novak et al. | |
| 7,577,687 B2 | 8/2009 | Bank et al. | |
| 7,788,382 B1 | 8/2010 | Jones et al. | |
| 8,149,113 B2 | 4/2012 | Diem | |
| 8,160,495 B2 | 4/2012 | Khedouri et al. | |
| 8,170,988 B2 | 5/2012 | Yukawa et al. | |
| 8,171,171 B2 | 5/2012 | Kim et al. | |
| 8,620,858 B2 | 12/2013 | Backholm et al. | |
| 2006/0293066 A1* | 12/2006 | Edge | H04W 4/02 455/456.3 |
| 2007/0026871 A1* | 2/2007 | Wager | H04W 4/02 455/456.1 |

(Continued)

FOREIGN PATENT DOCUMENTS

WO    2003073292 A1    9/2003

*Primary Examiner* — William Nealon

(57) ABSTRACT

A system and method for geofencing includes sending, by the location management server, location data collection criteria and location data reporting criteria to a first location-aware client; and receiving, by the location management server, location data from the first location-aware client, the location data collected by the first location-aware client according to the location data collection criteria, the location data received from the first location-aware client according to the location data reporting criteria.

44 Claims, 8 Drawing Sheets

(56) References Cited

U.S. PATENT DOCUMENTS

| | | | |
|---|---|---|---|
| 2009/0030917 A1 | 1/2009 | Guo et al. | |
| 2009/0191896 A1* | 7/2009 | Ge | H04W 64/00 |
| | | | 455/456.2 |
| 2012/0149388 A1* | 6/2012 | West | G01S 5/00 |
| | | | 455/456.1 |
| 2013/0117406 A1 | 5/2013 | Chevillat et al. | |
| 2013/0194999 A1* | 8/2013 | Anchan | H04W 76/002 |
| | | | 370/312 |
| 2014/0378167 A1 | 12/2014 | Haney | |
| 2016/0029224 A1* | 1/2016 | Edge | G01S 5/0252 |
| | | | 455/456.1 |

\* cited by examiner

SYSTEM AND METHOD FOR GEOFENCING

CROSS-REFERENCE TO RELATED APPLICATIONS

This application claims the benefit of U.S. Provisional Application No. 62/245,876, filed on Oct. 23, 2015, which application is hereby incorporated herein by reference.

TECHNICAL FIELD

The present invention relates generally to communications over a network, and, in particular embodiments, to a system and method for geofencing.

BACKGROUND

Geofencing may allow software or hardware applications to use global positioning system (GPS) or radio frequency identification (RFID) to define geographical boundaries for, e.g., a network, network service(s), or the like. Geofencing may have applications in public safety. Geofencing functions may be performed by one or more servers, and communications between the client devices and the servers may be performed over a network (e.g., a carrier network, Wi-Fi, etc.). However, as interest in geofencing has increased, new challenges are being discovered with the messaging protocols used to exchange location data.

SUMMARY

In accordance with a preferred embodiment of the present invention, a method, by a location management server, includes: sending, by the location management server, location data collection criteria and location data reporting criteria to a first location-aware client; and receiving, by the location management server, location data from the first location-aware client, the location data collected by the first location-aware client according to the location data collection criteria, the location data received from the first location-aware client according to the location data reporting criteria.

In some embodiments, the location data collection criteria and the location data reporting criteria are the same. In some embodiments, sending the location data collection criteria and the location data reporting criteria includes: storing, by the location management server, the location data collection criteria and the location data reporting criteria in a database (DB) cluster accessible to the location management server, the location data collection criteria and the location data reporting criteria each stored in an observable data field of the DB cluster. In some embodiments, receiving the location data from the first location-aware client includes: observing, by the location management server, synchronization of the location data from a first local database at the first location-aware client into a database (DB) cluster accessible to the location management server. In some embodiments, the location data collection criteria specifies location data collection as a function of at least one of: time elapsed, distance traveled by the first location-aware client, velocity of the first location-aware client, acceleration of the first location-aware client, altitude of the first location-aware client, access network events of the first location-aware client, environmental sensor events of the first location-aware client, and health sensor events of the first location-aware client. In some embodiments, the location data reporting criteria specifies location data reporting as a function of at least one of: time elapsed, distance traveled by the first location-aware client, velocity of the first location-aware client, acceleration of the first location-aware client, altitude of the first location-aware client, access network events of the first location-aware client, environmental sensor events of the first location-aware client, and health sensor events of the first location-aware client. In some embodiments, the location data includes a geographic latitude and longitude of the first location-aware client. In some embodiments, the location data further includes a timestamp of the location data, an indication of events causing the location data to be collected by the first location-aware client, network information for the first location-aware client, or a combination thereof. In some embodiments, the method further includes: evaluating, by the location management server, the location data received from the first location-aware client to determine a current location-state of the first location-aware client with respect to a geofence, the current location-state indicating whether the first location-aware client has entered the geofence, has exited the geofence, is inside of the geofence, or is outside of the geofence; and performing, by the location management server, one or more actions in accordance with the current location-state of the first location-aware client. In some embodiments, the one or more actions performed by the location management server includes: sending, by the location management server, to one or more location-aware clients including the first location-aware client, a notification to each of the one or more location-aware clients, the notification indicating the current location-state of the first location-aware client with respect to the geofence, or a current location of the first location-aware client. In some embodiments, sending the notification includes: storing, by the location management server, a document indicating the notification in a database (DB) cluster accessible to the location management server, the document stored in an observable data field of the DB cluster, the one or more location-aware clients synchronizing with the location management server in response to the document being stored in the observable data field. In some embodiments, the geofence is a virtual boundary established with respect to an anchor point tracked by the location management server, the anchor point being one of stationary or in motion. In some embodiments, the method further includes: receiving, by the location management server, a request from a second location-aware client for the location data collected by the first location-aware client, the location data collection criteria and the location data reporting criteria sent to the first location-aware client in response to receiving the request. In some embodiments, receiving the request from the second location-aware client for the location data includes: observing, by the location management server, synchronization of the request from a second local database at the second location-aware client into a database (DB) cluster accessible to the location management server. In some embodiments, the request from the second location-aware client indicates at least one of the location data collection criteria and the location data reporting criteria. In some embodiments, the request from the second location-aware client indicates a definition of a geofence, and further indicates instructions to filter the location data from the first location-aware client according to a current location-state of the first location-aware client with respect to the geofence, the current location-state indicating whether the first location-aware client has entered the geofence, has exited the geofence, is inside of the geofence, or is outside of the geofence. In some embodiments, the method further includes: determining, by the location management server, the current location-state of the first location-aware client with respect to the geofence; and executing the instructions indicated by the request from the second location-aware client. In some embodiments, the method further includes: transmitting, by the location management server, the definition of the geofence and the instructions to the first location-aware client.

In accordance with a preferred embodiment of the present invention, a method, by a first location-aware client, includes: receiving, by the first location-aware client, location data collection criteria and location data reporting criteria from a location management server; collecting, by the first location-aware client, location data in accordance with location data collection criteria; storing, by the first location-aware client, the location data in a first local database at the first location-aware client; and reporting, by the first location-aware client, at least a portion of the location data to the location management server in accordance with the location data reporting criteria.

In some embodiments, the method further includes: receiving, by the first location-aware client, a definition of a geofence, the geofence being a virtual boundary established with respect to an anchor point; and determining, by the first location-aware client, a current location-state of the first location-aware client with respect to the geofence by evaluating the location data collected by the first location-aware client, the current location-state indicating whether the first location-aware client has entered the geofence, has exited the geofence, is inside of the geofence, or is outside of the geofence. In some embodiments, the method further includes: receiving, by the first location-aware client, a set of instructions from the location management server, each of the set of instructions associated with a predetermined location-state; and executing, by the first location-aware client, an instruction of the set of instructions in response to the predetermined location-state of the instruction corresponding to the current location-state of the first location-aware client, after collecting the location data. In some embodiments, the set of instructions includes a directive to report the current location-state of the first location-aware client to the location management server. In some embodiments, the set of instructions includes a directive to report at least a portion of the location data in accordance with the location data reporting criteria. In some embodiments, the set of instructions includes a directive to perform one or more actions, the one or more actions including one of sending a message to the location management server, and invoking a service at the first location-aware client. In some embodiments, receiving the set of instructions from the location management server includes: observing, by the first location-aware client, synchronization of the set of instructions from a DB cluster accessible to the location management server into the first local database. In some embodiments, receiving the set of instructions from the location management server includes: receiving, by the first location-aware client, a multicast transmission including the set of instructions. In some embodiments, the multicast transmission is an Evolved Multimedia Broadcast Multicast Services (eMBMS) transmission. In some embodiments, receiving the definition of the geofence includes: observing, by the first location-aware client, synchronization of the definition of the geofence from a DB cluster accessible to the location management server into the first local database. In some embodiments, receiving the location data collection criteria and the location data reporting criteria from the location management server includes: observing, by the first location-aware client, synchronization of the location data collection criteria and the location data reporting criteria from a DB cluster accessible to the location management server into the first local database. In some embodiments, receiving the location data collection criteria and the location data reporting criteria from the location management server includes: receiving, by the first location-aware client, a multicast transmission including the location data collection criteria and the location data reporting criteria. In some embodiments, the multicast transmission is an Evolved Multimedia Broadcast Multicast Services (eMBMS) transmission. In some embodiments, the method further includes: receiving, by the first location-aware client, an update for the definition of the geofence. In some embodiments, the update for the definition of the geofence includes a change in location coordinates of the anchor point, shape of the geofence, size of the geofence, or a combination thereof. In some embodiments, the anchor point of the geofence is static. In some embodiments, the anchor point of the geofence is in motion. In some embodiments, the geofence is a two-dimensional shape. In some embodiments, the geofence is a three-dimensional shape.

In accordance with a preferred embodiment of the present invention, a location management server includes: a processor; and a computer readable storage medium storing programming for execution by the processor, the programming including instructions for: sending location data collection criteria and location data reporting criteria to a first location-aware client; and receiving location data from the first location-aware client, the location data collected by the first location-aware client according to the location data collection criteria, the location data received from the first location-aware client according to the location data reporting criteria.

In some embodiments, the programming further includes instructions for: evaluating the location data to determine a current location-state of the first location-aware client with respect to a geofence; and performing an action according to the current location-state of the first location-aware client. In some embodiments, the programming further includes instructions for: indicating a definition of a geofence and instructions to the first location-aware client, the instructions executed by the first location-aware client in response to determining a current location-state of the first location-aware client with respect to the geofence. In some embodiments, the instruction for sending the location data collection criteria and the location data reporting criteria includes instructions for: transmitting a multicast transmission indicating the location data collection criteria and the location data reporting criteria to a plurality of location-aware clients including the first location-aware client. In some embodiments, the instruction for sending the location data collection criteria and the location data reporting criteria includes instructions for: storing, by the location management server, a document indicating the location data collection criteria and the location data reporting criteria in a database (DB) cluster accessible to the location management server, the document stored in an observable data field of the DB cluster, the first location-aware client synchronizing with the location management server in response to the document being stored in the observable data field.

In accordance with a preferred embodiment of the present invention, a first location-aware client includes: a processor; and a computer readable storage medium storing programming for execution by the processor, the programming including instructions for: receiving location data collection criteria and location data reporting criteria from a location management server; collecting location data in accordance with location data collection criteria; storing the location data in a first local database at the first location-aware client; and reporting at least a portion of the location data to the location management server in accordance with the location data reporting criteria.

In some embodiments, the programming includes further instructions for: receiving a definition of a geofence definition and instructions corresponding to a current location-state of the first location-aware client; and executing the instructions in response to determining the current location-state of the first location-aware client, the current location-state determined by evaluating the location data.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
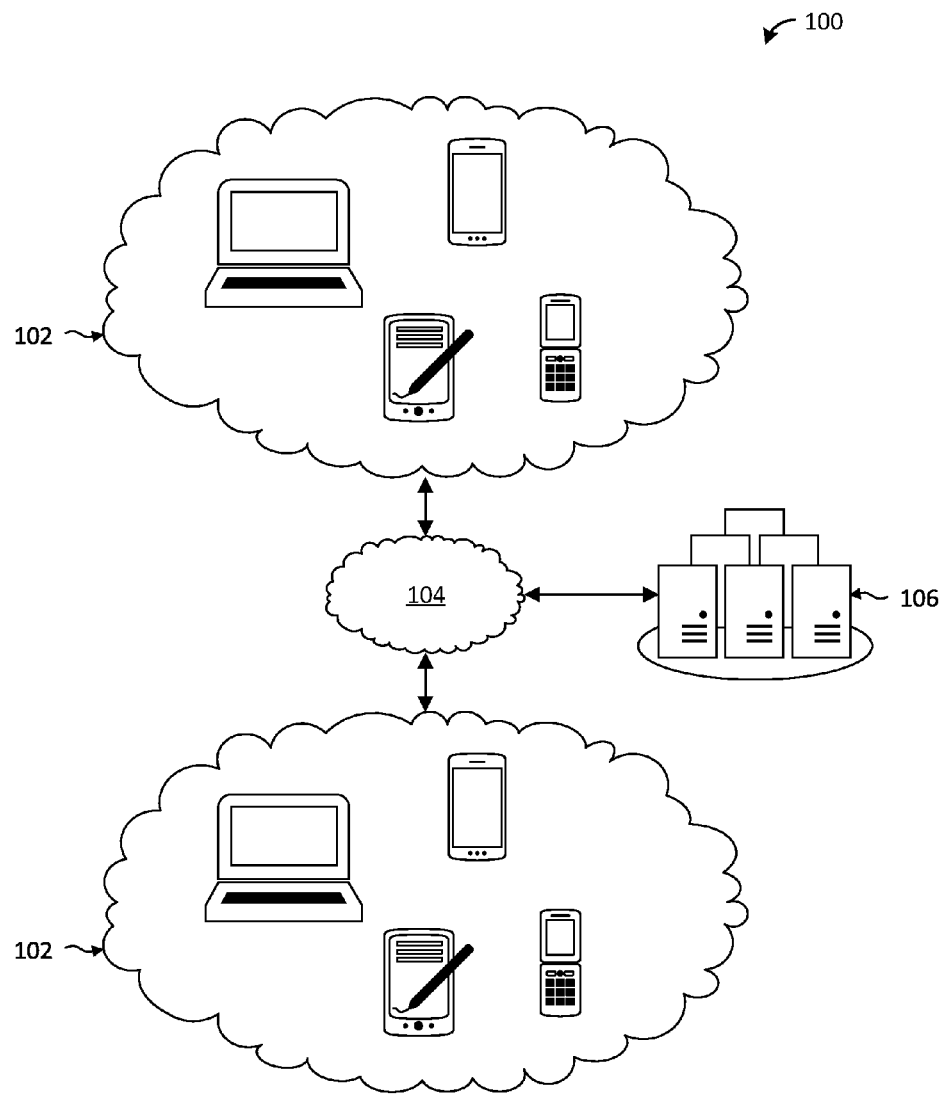
FIG. 1 is a diagram of a communications system.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

A geofence is a virtual geographic perimeter, with coordinates fixed relative to an anchor point. The anchor point may be inside, outside, or on an edge or a vertex of the perimeter. The perimeter may be 2-dimensional or 3-dimensional. The geofence may be static (e.g., may not move), or may be dynamic (e.g., the anchor point may be in motion, or the shape and/or size of the perimeter may change with time). Some location-based service applications may record the path taken by one or more targets, and trace the path on a map view. Such a path may be referred to as a "breadcrumb view" herein. The breadcrumb view may be presented in real-time, as an event occurs, or may be stored for later viewing and/or analysis. Some geofencing applications may include locating subjects or personnel within a certain distance or area of an event, such as an ongoing emergency. For example, a static geofence may be set up in proximity of a road accident, or a dynamic geofence may be set up by emergency responders in pursuit of an errant vehicle.

A geofence may be a fully bounded region (e.g., a polygon, circle, etc.), a partially bounded region (e.g., a corridor), or a fully unbounded region (e.g., everywhere). In a fully unbounded geofence, a client device is considered inside the geofence everywhere. Some geographic regions may be excluded from the unbounded region such that the client device is considered inside the geofence everywhere except when the client device is located in an excluded region.

A system and method for geofencing is provided according to various embodiments. In particular, location-aware clients in a group collect location data and report it to a location management server according criteria specified by the location management server. The location-aware clients collect and store location data in a local data store (e.g., a data store on a client device on which a location-aware client is operating), according to the collection criteria. The collected location data is used to determine whether the location-aware clients are inside or outside of a geofence. In some embodiments, the location data is transferred to the location management server via database synchronization, and the location management server makes the determination for each of the location-aware clients. The location-aware clients report the collected location data to the location management server according to the reporting criteria. In some embodiments, the collection and the reporting criteria may be same, causing the client to report the location data as soon as it is collected. In some embodiments, geofence definitions are provided to the location-aware clients, and each location-aware client makes its own determination regarding whether a client device is located in a geofence. One or more actions may be taken by the location-aware clients in response to determining the location-aware clients are inside or outside of the geofence. In some embodiments, a notification may be sent to one or more members of the group indicating an event such as a location-aware client entering or leaving the geofence. In some embodiments, the criteria for collecting and/or reporting location data may be adjusted. The actions taken by the location-aware clients may be specified with the collection and reporting criteria specified by the location management server.

Embodiments may achieve advantages. Storing location data in a local data store and transferring it via data synchronization may simplify time-domain ordering of the location data, simplifying the process of determining the current or most recent location of a location-aware client, especially when analyzing a large set of location data. Performing the determination on the location management server may simplify hardware and software limitations on user devices, allowing geofencing management implementations to be platform agnostic and avoiding platform-specific geofencing limitations. Performing the determination on the location-aware client may optimize or at least improve uplink radio access network (RAN) resource utilization while maintaining a higher degree of granularity for location data reporting; may allow for more accurate location based services through the use of localized decision making on the edge devices; and may allow broadcast or multicast transport mechanisms to be used, further improving RAN resource utilization.

FIG. 1 is a diagram of a communications system 100, which provides an architecture for supporting a telecommunications solution (e.g., a push-to-talk (PTT) communications solution) in accordance with some embodiments. Communications system 100 includes client devices 102, a communications network 104, and a telecommunications services platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "clients") reside on the client devices 102 for accessing various functions, such as location functions, provided by the telecommunications solution.

The client devices 102 may communicate with the telecommunications services platform 106 over the communications network 104, which may be accessed by the client devices 102 through a cellular network deployed by a carrier, a WiFi network, a RAN, other wireless networks, a wired internet protocol (IP) network, combinations thereof, or the like. The communications network 104 may include one or more components configured to provide wireless or wired network access, such as an enhanced Node B (eNB), a macro-cell, a femtocell, a Wi-Fi access point (AP), combinations thereof, or the like. Furthermore, the communications network 104 may operate in accordance with one or more wireless communication protocols, e.g., open mobile alliance (OMA), LTE, LTE advanced (LTE-A), High Speed Packet Access (HSPA), Wi-Fi 802.11a/b/g/n/ac, etc. In some embodiments, the communications network 104 may comprise various other devices, such as relays, low power nodes, etc. The communications network 104 may further include backhaul network components, such as various gateways, routers, controllers, schedulers, and the like.

In an embodiment where the telecommunications services platform 106 is a PoC platform, subscribers to a PTT solution (e.g., users operating the client devices 102) may be provisioned onto communications system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. The PTT platform may provide a plurality of PTT functions to the client devices 102 through the PTT clients on the client devices 102 as described in greater detail below.

In some embodiments, the telecommunications services platform 106 uses container technology for virtualization of a telecommunications system architecture, such as, the virtualization of provided PTT services. Example container technologies may include Docker, Rocket, LXD, and the like although the architecture is not limited to a specific container technology. Virtualization using container technology may allow the telecommunications services platform 106 to adopt a micro-services model in which service clusters are considered the building blocks of the system architecture. For example, each function provided by the telecommunications services platform 106 may be virtualized in a unique service cluster, and each service cluster may perform a different function in the telecommunications services platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the telecommunications services platform) to be independently deployed and managed. Thus, system resilience may be improved as failures are localized to individual services. Furthermore, rapid and agile deployment of services may also be achieved.

In some embodiments, the telecommunications services platform 106 incorporates distributed databases, clustering technologies, data analytics tools, and messaging middleware to provide a robust, scalable platform. The telecommunications services platform 106 may use fully virtualized components with a layered approach to service orchestration, which allows the telecommunications services platform 106 to be integrated into various cloud environments, such as a carrier's private cloud infrastructure, a dedicated PTT cloud infrastructure, combinations thereof, and the like. A more detailed description of an embodiment telecommunications services platform may be found in commonly-assigned U.S. patent application Ser. No. 14/994,757 filed on Jan. 13, 2016, entitled "System and Method for Elastic Scaling using a Container-Based Platform," which is hereby incorporated by reference. Other telecommunication services platforms, including other PTT platforms, may be used in other embodiments.

Embodiment geofencing techniques provide one or more supervisors of a group the ability to track the location of members in a group. As used herein, the term "supervisor" refers to a user of the group with elevated privileges, e.g., a user with elevated privileges. The group may be, e.g., a call group and members of the group may be, e.g., location-aware clients deployed on client devices. The geofence may be applied for members of the group. The supervisor(s) may track member locations of a group on a map, manage geofencing, and view reports about the group. In some embodiments, location of group members may be refreshed on demand, e.g., upon request of the supervisor. Some embodiments allow a supervisor to be a supervisor in multiple groups, e.g., may request and view locations on a 1-to-many basis. Users may be a member of multiple groups, and may also have a 1-to-many relationship for reporting and geofencing. Location data may be collected or request on-demand, and may be triggered out-of-band via notifications. In some embodiments, the anchor of a geofence may follow the location of the supervisor in a group. In some embodiments, groups may have multiple supervisors, and thus a group may have more than one geofence.

Figure 2:
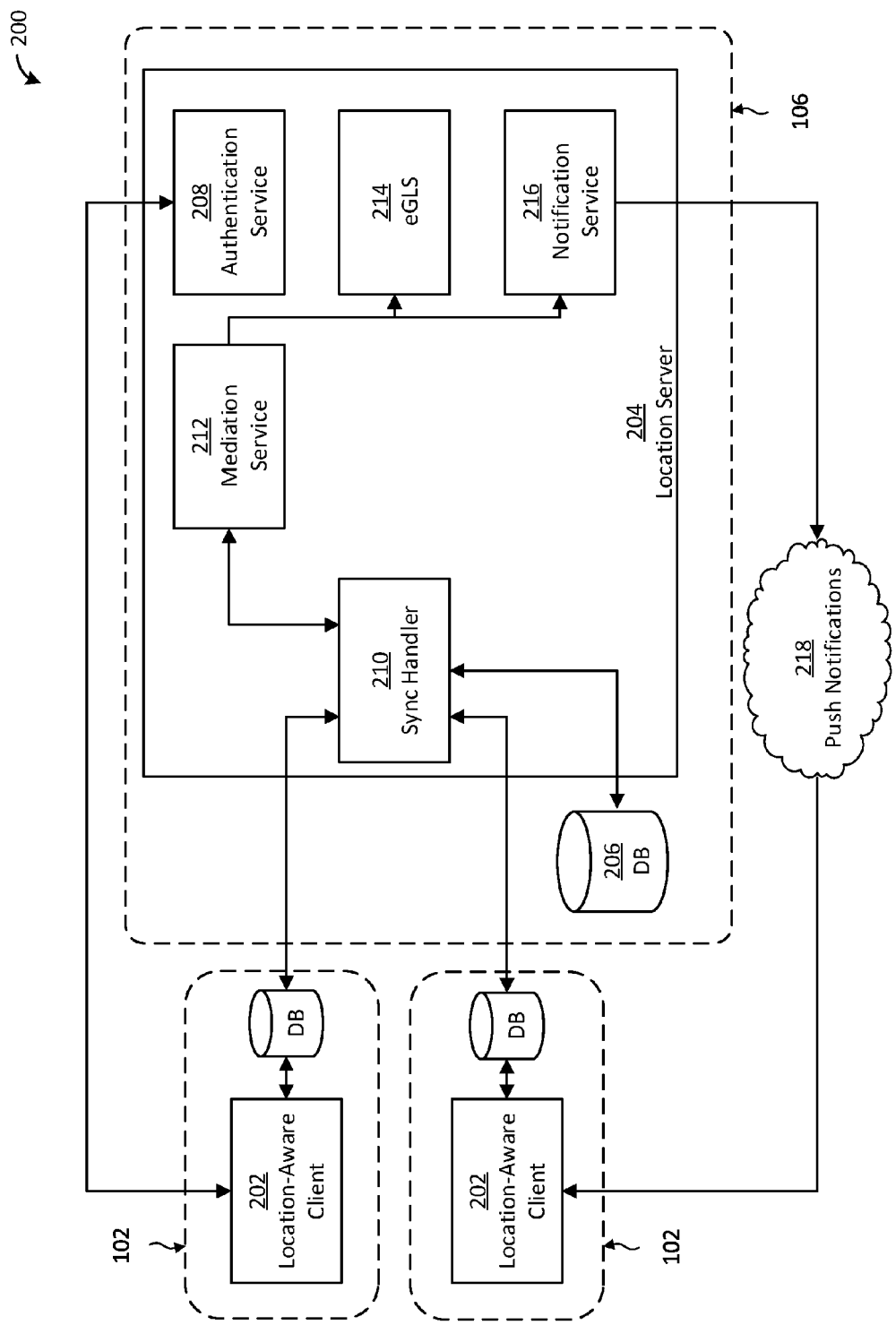
FIG. 2 is a block diagram of components in the communications system.

FIG. 2 is a block diagram of components in the communications system 100 that form a location management system 200. The client devices 102 run a location-aware client 202, which may be a hardware or a software client. The telecommunications services platform 106 runs a location management server 204, which may be software, and a database (DB) cluster 206. The location management system 200 supports content messaging between the location-aware clients 202.

The location management server 204 includes an authentication service 208, synchronization handlers 210, a mediation service 212, an enhanced geolocation service (eGLS) 214, and a notification service 216. The various services and handlers of the location management server 204 provide a platform based on unstructured data synchronization that is utilized to enhance data routing orchestration services for a location management platform. The location-aware clients 202 access a mobile data store or local database (DB) at the client devices 102, and data synchronization is used for data orchestration between the location-aware clients 202 and the location management server 204, thereby managing network dependence and reducing cruft code during development. The data and data storage may be unstructured or schemaless, which may allow new features to be developed and deployed in the location management system 200 without affecting current frameworks, and may coexist with current frameworks, thereby reducing the time to market for new features and enhancements. Data synchronization may be used instead of messaging protocols such as XML Configuration Access Protocol (XCAP) or XQuery and XPath Data Model (XDM), avoiding the limitations of such protocols and simplifying implementations on both the location-aware client 202 and the location management server 204. Because the local DB is always available to the location-aware client 202, the location-aware client 202 may read, write, and query data in the local DB even when not connected to the location management server 204.

The location-aware client 202 stores content (such as messages) in the local DB, which is synchronized to the DB cluster 206 at the location management server 204. The location-aware client 202 uses the local DB for a basic message content store, using database operations such as create, read, update and delete (CRUD) operations at the client layer. Content synchronization is offloaded to a loosely connected DB layer, which performs synchronization via the synchronization handlers 210. The data synchronization may include copying records from the local DB to the DB cluster 206; merging data in the local DB and the DB cluster 206; resolving synchronization conflicts; and updating and/or deleting records in the local DB and/or the DB cluster 206. Performing synchronization at the DB layer may reduce the amount of networking implemented in the location-aware client 202. The location management server 204 supports change notifications via webhooks, which can trigger native methods of listening for or observing changes. This triggering is based on data-change events and event processing using event routers, such as the mediation service 212 (discussed below). Event-based processing facilitates asynchronous processing of content messages based on data availability. The location-aware clients 202 and/or the location management server 204 observe the changes in the data stored in the DB cluster 206 caused by synchronization. Observation may be performed by receiving an event notification that the location-aware clients 202 and/or the location management server 204 respond to.

Although the illustrated embodiments are presented in the context of delivering location data, it should be appreciated that a wide variety of services may be delivered using embodiment content messaging techniques.

The DB cluster 206 may be a structured or an unstructured data store. In an embodiment, the DB cluster 206 is a NoSQL database, although any data storage could be used. Data for the location management system 200 is stored in the DB cluster 206. In some embodiments, the DB cluster 206 is single cluster (or multiple clusters of DBs), and all of the local DBs may replicate their copy of data, which is a subset of the dataset in the single cluster. In some embodiments, the DB cluster 206 includes several separate databases (or separate clusters of databases), and the various local DBs may replicate all of the data in one of the separate databases.

The authentication service 208 provides authentication functions, and authenticates the location-aware clients 202 when they connect to the location management server 204. The authentication service 208 check user credentials against data in the DB cluster 206. If authentication succeeds, the location-aware clients 202 are permitted to access the location management server 204.

The synchronization handlers 210 provide seamless and secure data synchronization between the local DB on the location-aware clients 202 and the DB cluster 206. The synchronization handlers 210 manage the delivery of content to/from the location-aware clients 202 and the DB cluster 206 via an abstracted data management layer. The synchronization handlers 210 may synchronize all of the data in the DB cluster 206 with the location-aware clients 202, or may synchronize a subset of the data in the DB cluster 206. For example, the synchronization handlers 210 may support fine-grained, filter-based data synchronization and delivery to the location-aware clients 202. The synchronization handlers 210 may synchronize the location-aware clients 202 and the DB cluster 206 on-demand, or may do so on a basis that is managed by the location management server 204. In some embodiments, data synchronization may be event based. Although shown as part of the location management server 204, it should be appreciated that the synchronization handlers 210 may be part of another system. For example, the synchronization handlers 210 may be part of the DB cluster 206.

There may be more than one of the synchronization handlers 210. For example, there may be different synchronization handlers 210 for each major mobile platform supported. As such, the location management server 204 may have mobile cross-platform support, and cross platform mobile development may be accomplished with a common code base.

The synchronization handlers 210 may communicate with the location-aware clients 202 through a load balancer (not shown), such as a reverse proxy. Communication with the location-aware clients 202 may be over a secure transport, e.g., transport layer security (TLS), secure sockets layer (SSL), etc. The location-aware clients 202 may support secure local storage, and may encrypt the local DB.

The mediation service 212 interacts with the synchronization handlers 210, and performs application level functionality when data is synchronized between the location-aware clients 202 and the DB cluster 206. In some embodiments, the mediation service 212 is notified by the synchronization handlers 210 of data changes via a webhook upon successful synchronization. Upon a data change, the mediation service 212 may act as an application broker, and may dispatch the enhanced geolocation service 214.

The enhanced geolocation service 214 supports location services such as geofencing. For example, multiple location-aware clients 202 may send their location to the location management server 204 via data synchronization. The location service is dispatched by the mediation service 212 to apply geofencing rules to the received locations, make changes to the call according to the applied rules, and notify the location-aware clients 202 of changes by updating the DB cluster 108. The location-aware clients 202 may then fetch the changes through data synchronization.

The notification service 216 is dispatched by the enhanced geolocation service 214 based on application logic. For example, after determining the location-state of a location-aware client 202, the 214 may invoke the notification service 216 to deliver a notification to the recipient location-aware client 202. The notification triggers the recipient location-aware client 202, causing it to fetch the new message in response to receiving the notification. In some embodiments, the notification service 216 may use a push notification provider 218 to deliver notifications. For example, in embodiments where the location-aware client 202 is an Apple device, the push notification provider 218 may be Apple Push Notification Service (APNS) that is used to notify the location-aware client 202. Likewise, the push notification provider 218 may be Google Cloud Messaging (GCM) in embodiments where the location-aware client 202 is an Android device.

The location-aware clients 202 collect location data about their locations, and publish it to the location management server 204. Database synchronization may be used to exchange the location data. The location data may be used several ways by the location services. Location data is collected and reported according to location data collection criteria and location data reporting criteria specified by the location management server 204.

The collection criteria specifies how the location-aware clients 202 should collect and persist location data in their local DB. The reporting criteria specifies how frequently the location-aware clients 202 should report the collected location data to the location management server 204. The location data collection and reporting criteria may include a variety of elements. Examples of criteria include: time elapsed (frequency); distance traveled; altitude changes. Criteria may also include access network related events such as cell changes, public land mobile network (PLMN) changes, Wi-Fi access point changes, Wi-Fi service set identifier (SSID) changes, multimedia broadcast multicast services (MBMS) service area changes, multicast-broadcast single-frequency network (MBSFN) area changes, tracking area changes, and the like. Criteria may also include events detected by an environmental sensor, such as motion detection, changes to temperature, velocity, acceleration, humidity, direction, and the like. Finally, criteria may also include events detected by a health sensor, such as heart rate, blood pressure, and the like.

The collection and reporting criteria may be changed dynamically during runtime. Various events may trigger a change. The location-aware clients 202 may receive new collection and/or reporting criteria from the location management server 204. The criteria may change according to a rule. For example, the location data reporting frequency may increase as a function of velocity. Likewise, the location data reporting frequency may increase when the location-aware client 202 is participating in a call.

Although embodiments describe herein use data synchronization to communicate geofence definitions and location data reports, it should be appreciated that a variety of protocols could be used. For example, the geofence definitions may be transmitted using a same or a different protocol than that used for transmitting the location data reports. In an embodiment, a subscribe-notify framework may be used to transmit geofence definitions, where the location-aware clients 202 subscribe to a geofence definition document and the location management server 204 notifies subscribers of document updates. Session initiation protocol (SIP) messages, such as SIP SUBSCRIBE and SIP NOTIFY messages may be used for implementing such a subscribe-notify framework. In another embodiment, the location management server 204 may send geofence definition documents to the location-aware clients 202 using unsolicited SIP messages, such as SIP PUBLISH and/or or SIP MESSAGE. The location data reports may also be transmitted with a variety of protocols. In an embodiment, HTTP-based interfaces, such as REST API calls, may be used. In another embodiment, SIP-based interfaces, such as SIP PUBLISH messages, may be used.

In a first embodiment, the location management server 204 evaluates location data and determines a location-state of a location-aware client 202. The location-state indicates whether the location-aware client 202 has entered the geofence, has exited the geofence, is inside the geofence, or is outside the geofence. In such embodiments, the location-aware clients 202 publish their location data to the location management server 204 continuously, e.g., after each new location data point is collected. The location data is collected and stored in the local DB. The location data in the local DB is synchronized to the DB cluster 206 at the location management server 204 for use by the group supervisors. Parameters for the geofence are stored at the location management server 204, and the location service tracks the changing location data from the location-aware clients 202, and applies business logic and spatial views to the location data to determine whether the location-aware clients 202 are inside or outside of (or have entered or exited) the geofence. The location service notifies the user and/or group supervisors that a location-aware client 202 has entered/exited the geofence; the notification may be in-band or out-of-band. If a group contains more than one supervisor/geofence, the location data may be evaluated against the plurality of geofences in the group. In some embodiments, the location service may use historic data from the location-aware clients 202 stored in the DB cluster 206 to produce breadcrumb views.

In a second embodiment, the location-aware clients 202 evaluate their own location data and determine their location-state. In such embodiments, the geofence parameters are sent to the location-aware clients 202. The location-aware clients 202 collect their location data continuously and store it in their local DBs. The location data is then used by the location-aware clients 202 to determine geofence entry/exit events using the fence parameters. In response to the entry/exit events, the location-aware clients 202 notify the members and/or the supervisors about the member's position with respect to a referenced geofence. In some embodiments, the location data may only be stored on the local DB, and may not be transferred to the location management server 204, thereby conserving uplink bandwidth utilization and allowing the location-aware clients 202 to determine the entry/exit events when network connectivity is unreliable.

The location data collected by the location-aware clients may be in several formats, and may include different information. At a minimum, the location data includes geographic location, such as latitude and longitude. Other information may include the altitude; timestamp; information about what event(s) triggered the data collection; and wireless network information, such as a cell identifier, location area code, tracking area code, Wi-Fi SSID, multicast-broadcast single-frequency network (MBSFN) area, and the like.

Figure 3A:
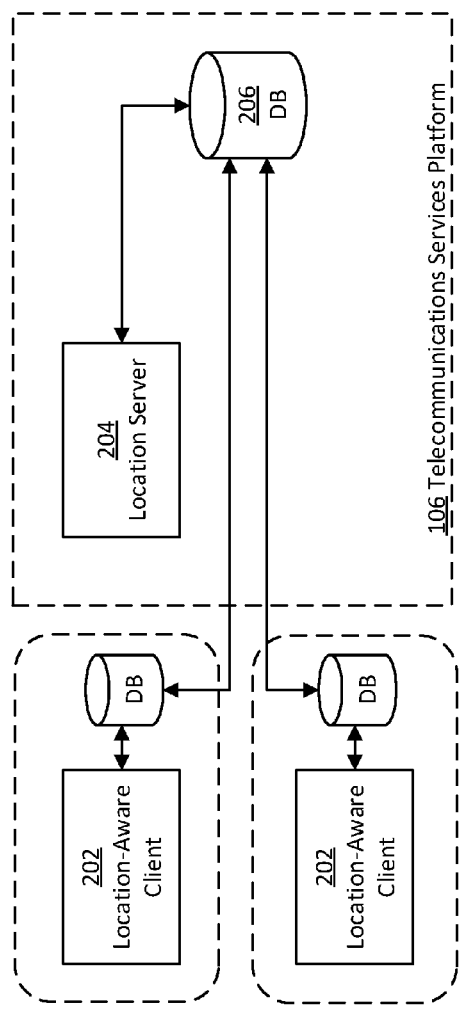
FIGS. 3A and 3B show data synchronization schemes.
Figure 3B:
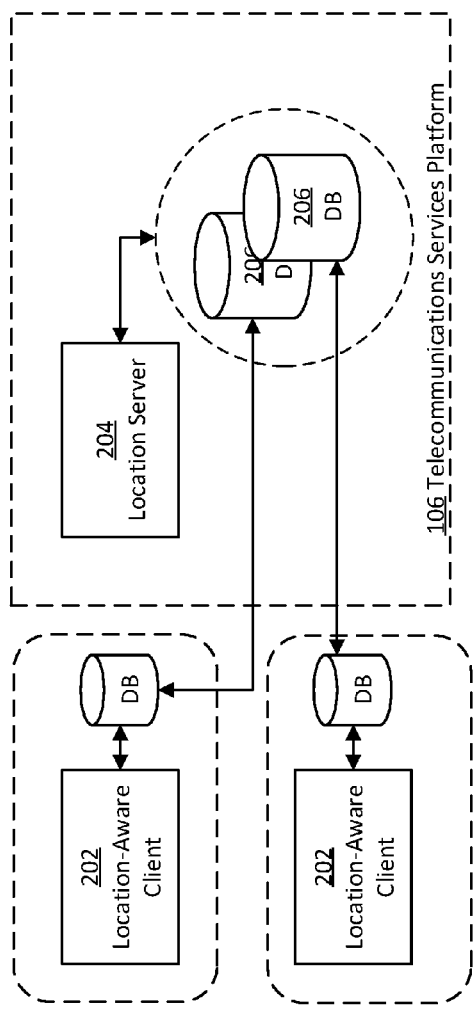

FIGS. 3A and 3B show data synchronization schemes. FIG. 3A shows an embodiment where the DB cluster 206 is single cluster. Each of the location-aware clients 202 replicate a subset of the data from the single database into their local DBs. FIG. 3B shows an embodiment where the DB cluster 206 includes several separate databases (or separate clusters of databases). Each of the location-aware clients 202 replicate all of the data from one of the separate databases into their local DBs.

Figure 4:
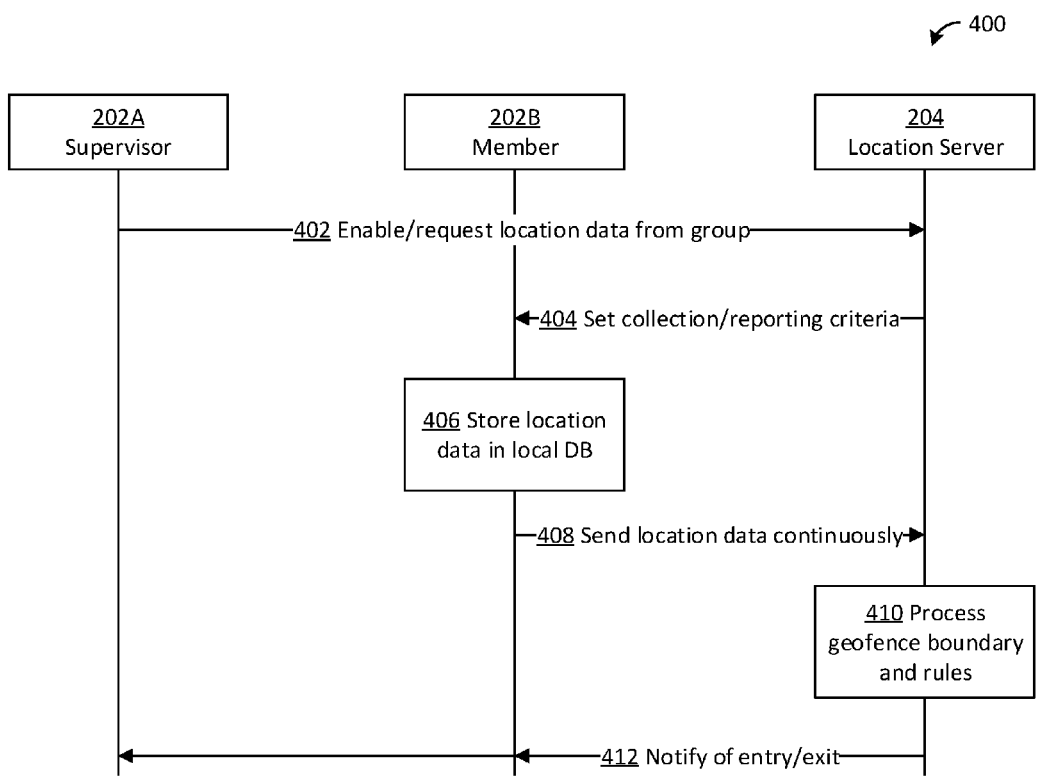
FIG. 4 is a protocol diagram of a first geofence monitoring method.

FIG. 4 is a protocol diagram of a first geofence monitoring method 400, according to an embodiment. The first geofence monitoring method 400 is an example method that may be used in embodiments where the location management server 204 evaluates location data and determines the location-state of a location-aware client 202. The location-aware clients 202 may be used by a group supervisor 202A and a group member 202B.

A location-aware client 202, such as the group supervisor 202A enables or requests location data for some or all of the location-aware clients 202 in the geolocation group (step 402). It should be appreciated that another location-aware client 202 besides the group supervisor 202A may request the location data Requesting the location data may establish one or more geofences. The request may be sent using the data synchronization mechanism discussed above. Control and signaling is implemented through data sets stored in the local DB of the group supervisor 202A, and the DB cluster 206, which are synchronized. In some embodiments, the group supervisor 202A requests the location data by creating a location data collection criteria and storing it in the local DB at the group supervisor 202A. Upon synchronization with the location management server 204, the mediation service 212 dispatches the location service to begin collecting location data from the location-aware clients 202.

The location management server 204 sends the location data collection criteria and the location data reporting criteria to the group member 202B (step 404). The collection and report criteria may be the same or different. In embodiments where they are the same, the group member 202B collects location data and reports it at the same frequency. Granularity of the location data may be increased or decreased by adjusting the criteria accordingly. In embodiments where they are different, the group member 202B collects location data at a configured frequency, but reports it at a different frequency. The group member 202B collects location data at a higher frequency than the reporting frequency. All or a subset of the collected location data may be reported at the time of reporting, in accordance with the reporting criteria.

The group member 202B may be notified to publish its location via a database trigger document from the location management server 204. The trigger document provides the configured values for the fence and the collection/reporting criteria to the client. The location management server 204 creates the location trigger document and persists in the DB cluster 206, and then synchronizes it to the local DB on the group member 202B.

The group member 202B records its location and storing the location data in its local DB (step 406). The group member 202B, upon receiving the trigger document, reads the configuration and being storing and publishing the location data continuously. Continuous publication of the location includes sending the location data to the location management server 204 after each update performed according to the collection criteria. The location data is stored in the local DB of the group member 202B with metadata. The location data is collected and stored in an industry standard format, such as GeoJSON or XML. The stored location data may be in a structured or unstructured data format, and the formatting may be specified by the trigger document. Updates to the location data is registered as a version change of the location data (e.g., by creating a metadata entry), and is tracked via the version of the location data document.

The group member 202B sends the stored location data to the location management server 204 (step 408). The data is sent according to the reporting criteria. The location data is sent by synchronizing the local DB of the group member 202B with the DB cluster 206 of the location management server 204. Sending location data through data synchronization may reduce signaling overhead, thereby conserving uplink RAN resources. In some embodiments, the location data is stored in an observable data format, and changes of that data may asynchronously trigger updating transmission of the updated data. In some embodiments, the location data set is shared across multiple interested parties, e.g., with both the location management server 204 and the group supervisor 202A, by synchronizing with those databases in a peer-to-peer manner, thereby optimizing the dispersal of data. The location data is time-ordered over a period of time through the use of version tracking of database elements (discussed above). The location data document is synced to the server at a pre-defined publish interval if the group member 202B is online, and the publish interval is specified by the reporting criteria. If the group member 202B is offline, it updates the location data and the local DB tracks the updates until the network is available for synchronization.

The location management server 204 applies the geofencing boundary and rules to the received location data (step 410). Processing may be performed, including computing the locations of the group member 202B within the geofence boundary using spatial views of data in the DB cluster 206, and the location of the group supervisor 202A as the geofence center. Other geofencing rules may also be applied to the location data at this time, such as notification rules. The location management server 204 receives a data change-transfer trigger for the location data via observables in the database layer during synchronization, and processes the rules in response. The location management server 204 determines geofence entry/exit events for the group member 202B using the fence parameters and the received location data.

The location management server 204 notifies the group supervisor 202A and the group member 202B in response to determining the location-state of the group member 202B (step 412). The notification is dispatched by the location service in response to the outcome of the entry/exit evaluation. The notification may be sent using an in-band or an out-of-band notification channel, depending on what channels are supported by the group member 202B.

Although the first geofence monitoring method 400 is discussed with respect to a single supervisor and a single geofence, it should be appreciated that a group may have more than one supervisor, and a member may participate in more than one group. As such, the location management server 204 may process location data from the group member 202B for all geofences that apply to the group member 202B, and may notify all of the relevant group supervisors 202A about geofence entry/exit events.

In some embodiments (not shown in FIG. 4), the group supervisor 202A may request an on-demand location update from the group member 202B. Such a request may be made out-of-band, e.g., between the normal location data collection intervals specified by the collection and/or reporting criteria. In such embodiments, the group supervisor 202A sends an on-demand location update request to the location management server 204, which forwards the request to the group member 202B. The group member 202B then responds to the request by updating its location in the local DB and synchronizing the update to the DB cluster 206. In some embodiments, the on-demand location update request may also include a request to report location data at a different frequency for a defined period of time. The request may be in the form of new temporary collection and/or reporting criteria. The group member 202B then uses the new criteria when reporting location data to the location management server 204. The location management server 204 forwards the location data back to the group supervisor 202A. Similar to the first geofence monitoring method 400 discussed above, each data transfer (e.g., request, criteria, location data, etc.) uses a change-notification mechanism to trigger data synchronization between the DB cluster 206 and the local DBs. For the group supervisor 202A and the group member 202B, the change-notification mechanism may be, e.g., an observable event in the local DBs.

Figure 5:
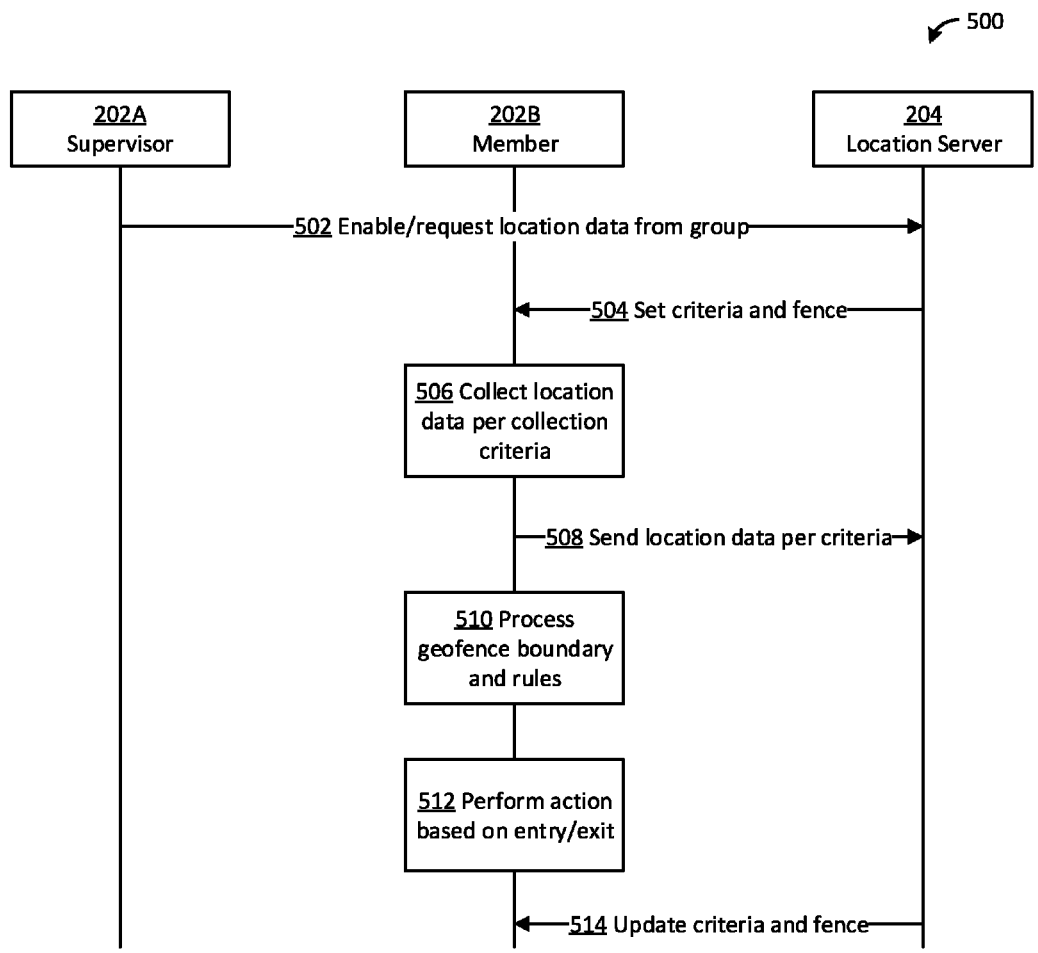
FIG. 5 is a protocol diagram of a second geofence monitoring method.

FIG. 5 is a protocol diagram of a second geofence monitoring method 500, according to an embodiment. The second geofence monitoring method 500 is an example method that may be used in embodiments where the location-aware clients 202 evaluate their own location data and determine their location-state.

A location-aware client 202, such as the group supervisor 202A, enables or requests location data for a location-aware client 202 (step 502). The location data may be requested from some or all of the location-aware clients 202 in the geolocation group, or from location-aware clients not in the group. It should be appreciated that another location-aware client 202 besides the group supervisor 202A may request the location data. Requesting the location data may establish one or more geofences. The request may be sent in a manner similar to step 402, above. Details of how the request is sent and what the request comprises will not be repeated herein.

The location management server 204 sends the geofence definitions to the group member 202B, along with location data collection criteria and the location data reporting criteria associated with each defined geofence (step 504). The geofences definitions may be sent using data synchronization. As in the first geofence monitoring method 400, the collection and reporting criteria may be the same or may be different. As such, the group member 202B collects location data at a configured frequency, but reports it at a different frequency. In an embodiment, the group member 202B collects location data at a higher frequency than the reporting frequency. The group member 202B may be notified to publish location via a unicast, multicast, or broadcast technique. In some embodiments, the location management server 204 broadcasts the geofence definitions to all location-aware clients 202 in a group call. In some embodiments, the collection and/or reporting criteria for a geofence may include instructions specifying certain actions for the group member 202B to perform upon entering or exiting the geofence. The actions are performed by the group member 202B on determining its location-state, and in some embodiments, the actions to be performed depend on the location-state.

The group member 202B records its location and stores the location data in its local DB based on the collection criteria for each geofence (step 506). The location data is stored in the local DB with metadata using techniques similar to those discussed above with respect to step 406, and therefore details will not be repeated herein.

The group member 202B sends the stored location data to the location management server 204 based on the reporting criteria for each geofence (step 508). The stored location data may be sent periodically, or in response to certain events. The location data is sent by synchronizing the local DB of the group member 202B with the DB cluster 206 of the location management server 204. The location data report sent to the location management server 204 may include more than one point of location data. In embodiments where the collection and reporting criteria are the same, each report includes one point of location data. In particular, it includes all location data accumulated since the previous location data report. For example, the group member 202B may record location data points at three times the frequency of the reporting frequency, and thus each location data report may include three location data points. In addition to the reporting criteria, other events may cause the group member 202B to send the location report. For example, the group member 202B may send the report in response to an express out-of-band request from the group supervisor 202A, or in response to a manual request by the user.

The group member 202B process boundaries and rules for each geofence using the geofences definitions and the collected location data (step 510). For each of the geofence definitions, the group member 202B determines whether it is inside or outside of the geofence. Based on the determination, the group member 202B performs the specified actions for the geofence upon determining that the geofence has been entered or exited (step 512).

In some embodiments, the specified action is a location data collection action, which may include changing the collection and/or reporting criteria. For example, the group member 202B may increase the collection and/or reporting frequency when it enters the geofence, and may decrease the collection and/or reporting frequency when it exits the geofence. In some embodiments, the specified action for a geofence may specify collection and/or reporting frequencies to use when the group member 202B is inside or outside of the geofence.

In some embodiments, the specified action includes sending a notification that the group member 202B has entered/existed the geofence. The notification may be sent to the location management server 204 using data synchronization. Alternatively, the notification may be directly sent to the group supervisor 202A in a peer-to-peer manner.

The location management server 204 sends updated geofences definitions to the group member 202B (step 514). The updated definitions may include updated collection and/or reporting criteria. The updated definitions may be sent using a unicast, multicast, or broadcast technique. In some embodiments, the initial geofence definitions may be sent to all location-aware clients 202 using a broadcast mechanism, and then a particular group member 202B may be updated using a unicast mechanism. Updating the geofence definition may include transmitting a new location of the geofence anchor or reference point, or transmitting a new shape/size of the encapsulated region.

Determining geofence entry/exit events and changing collection/reporting criteria by the group member 202B may improve the accuracy of location tracking and reduce RAN resource usage. In applications where public personnel safety is critical, location data may be collected more frequently for personnel closer to an ongoing emergency, and less frequently for personnel further from the emergency. Tracking may thus be more accurate for those closer to the emergency. Further, RAN resources may be conserved for those closer to the emergency, improving reliability during the more frequent reporting.

In some embodiments, the location data report sent to the location management server 204 in step 508 may be used for post-processing operations. For example, the data location data may be analyzed to determine the distance traveled, path taken, and the like for a location-aware client 202. This data may be also be used for optimizing things such as operational procedures for the users of the call group.

In some of the above embodiments, a broadcast or multicast technology such as LTE Evolved Multimedia Broadcast Multicast Services (eMBMS) may be used. eMBMS may be used for, e.g., the initial transmission of geofence definitions (step 504), and the transmission of updated geofence definitions (step 514). Use of eMBMS may include creating multicast bearers in the RAN, allowing the geofence definitions to be multicast to some or all location-aware clients 202 at once.

Figure 6:
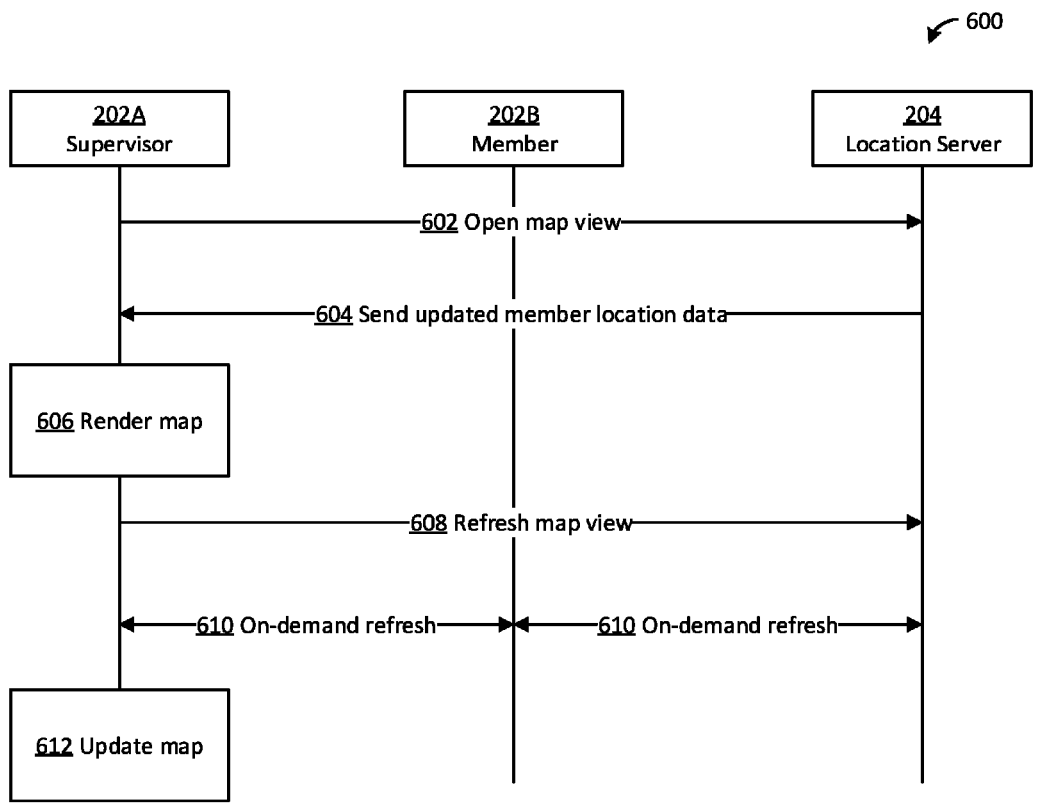
FIG. 6 is a protocol diagram of a map viewing method.

FIG. 6 is a protocol diagram of a map viewing method 600. The map viewing method 600 is used to produce a map for viewing after the supervisor is notified that a location-aware client 202 has entered/exited the geofence. The map viewing method 600 may be performed by the group supervisor 202A as part of the first geofence monitoring method 400 or the second geofence monitoring method 500.

The group supervisor 202A opens the map view and requests updated location information for the group members 202B (step 602). The location management server 204 sends the updated location information for the group supervisor 202A (step 604). The updated location information may include member location data documents for each user, and may be sent to the group supervisor 202A with data synchronization. The group supervisor 202A renders the map view, including plots of the paths and locations of the group members 202B (step 606). In some embodiments, the group supervisor 202A may request refreshed map view (step 608). The refresh may be manually requested by a user. In response to the refresh request, an on-demand location update may be performed with the group members 202B (step 610). The map view is then updated with the updated location data (step 612).

Figure 7:
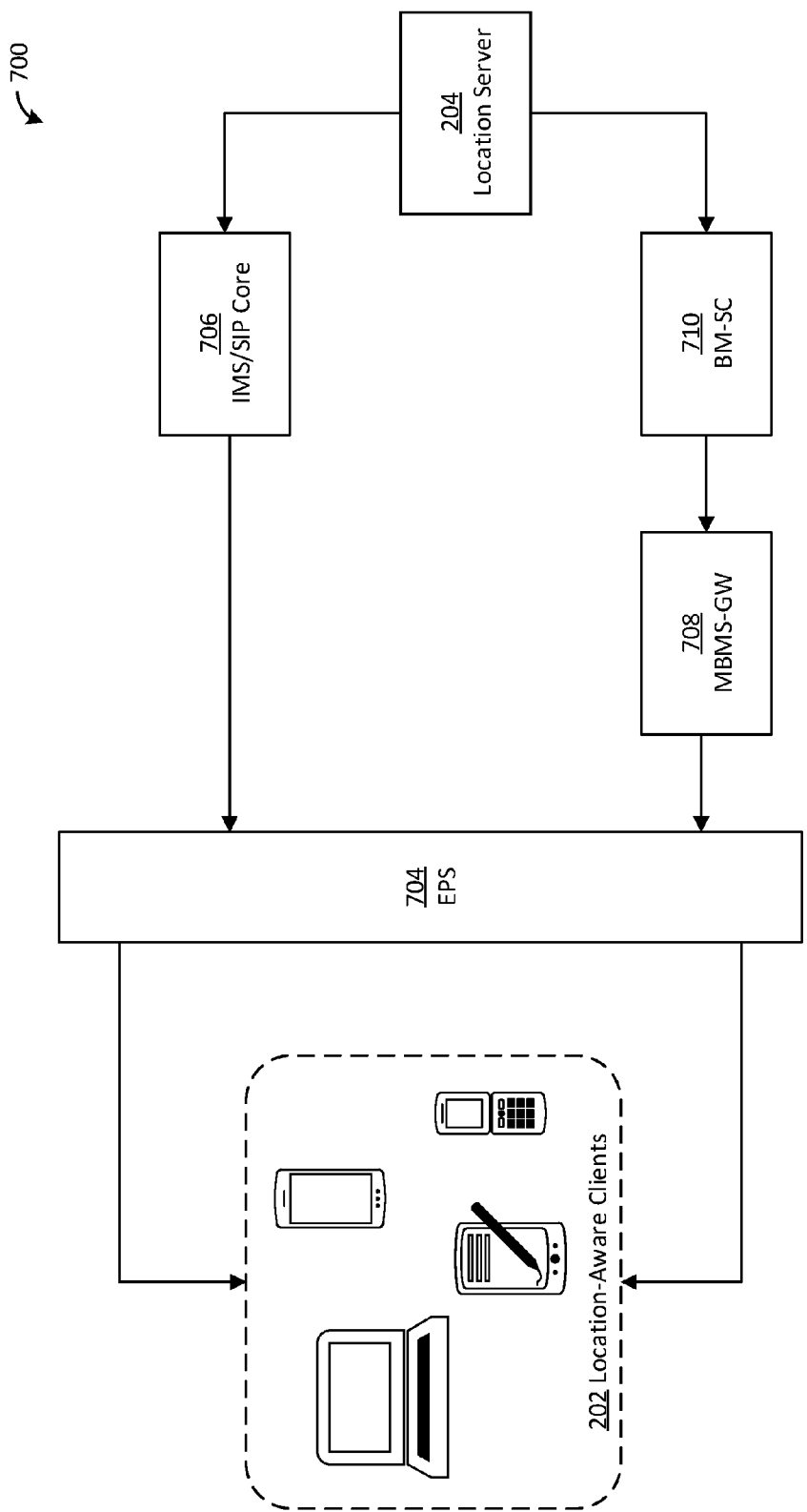
FIG. 7 is a block diagram of a multicast telecommunications system.

FIG. 7 is a block diagram of a multicast telecommunications system 700. The multicast telecommunications system 700 may be, e.g., an eMBMS system. The multicast telecommunications system 700 may be used for, e.g., the initial transmission of geofence definitions to a group, and the transmission of updated geofence definitions to the group. The multicast telecommunications system 700 includes the location-aware clients 202 in communication with the location management server 204. The multicast telecommunications system 700 also includes a core network 702, which may include features such as an evolved packet system (EPS) 704, a SIP/IP Multimedia Subsystem (IMS) core 706, a multimedia broadcast multicast services gateway (MBMS-GW) 708, and a broadcast multicast-service center (BM-SC) 710.

Figure 8:
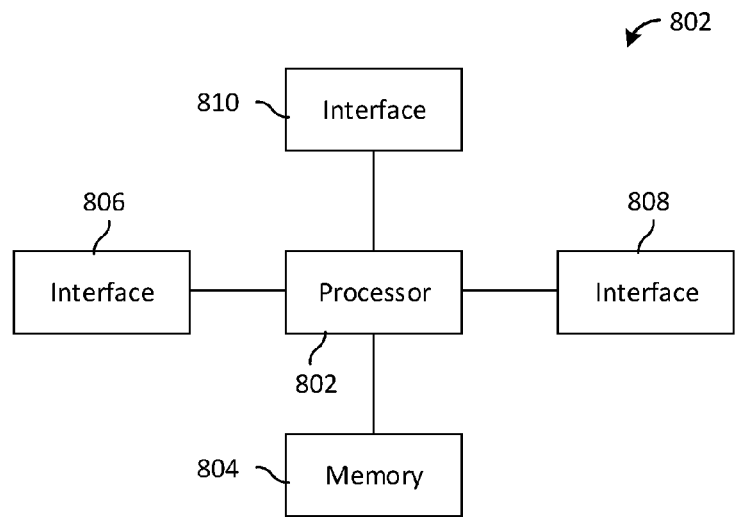
FIG. 8 is a block diagram of a processing system.

FIG. 8 is a block diagram of a processing system 800 for performing methods described herein, which may be installed in a host device. As shown, the processing system 800 includes a processor 802, a memory 804, and interfaces 806-810, which may (or may not) be arranged as shown in FIG. 8. The processor 802 may be any component or collection of components adapted to perform computations and/or other processing related tasks, and the memory 804 may be any component or collection of components adapted to store programming and/or instructions for execution by the processor 802. In an embodiment, the memory 804 includes a non-transitory computer readable medium. The interfaces 806, 808, 810 may be any component or collection of components that allow the processing system 800 to communicate with other devices/components and/or a user. For example, one or more of the interfaces 806, 808, 810 may be adapted to communicate data, control, or management messages from the processor 802 to applications installed on the host device and/or a remote device. As another example, one or more of the interfaces 806, 808, 810 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
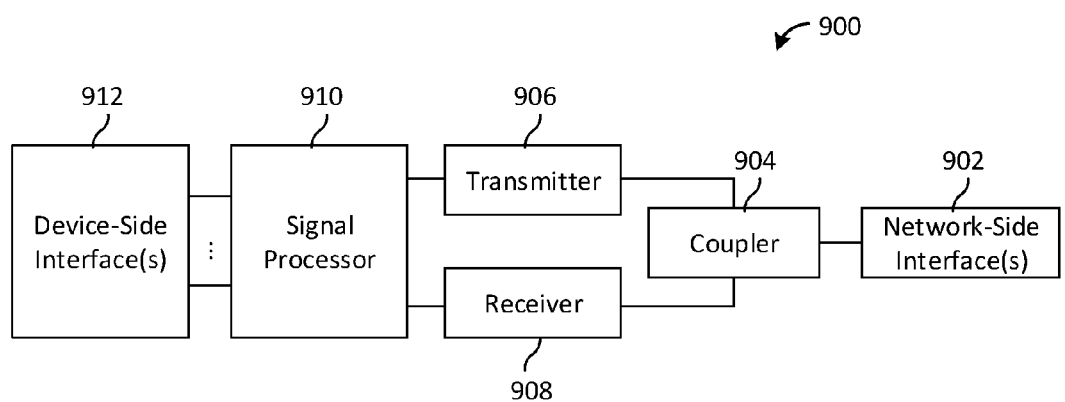
FIG. 9 is a block diagram of a transceiver.

In some embodiments, one or more of the interfaces 806, 808, 810 connects the processing system 800 to a transceiver adapted to transmit and receive signaling over the telecommunications network. FIG. 9 is a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, by a location management server, comprising:
   receiving, by the location management server, a request from a supervisory location-aware client of a plurality of location-aware clients, each of the location-aware clients Participating in a first push-to-talk (PTT) call;
   sending, by the location management server, location data collection criteria and location data reporting criteria to a first location-aware client of the location-aware clients;
   receiving, by the location management server, location data from the first location-aware client, the location data collected by the first location-aware client according to the location data collection criteria, the location data received from the first location-aware client according to the location data reporting criteria; and
   modifying, by the location management server, the first PIT call according to the received location data.

2. The method of claim 1, wherein the location data collection criteria and the location data reporting criteria are the same.

3. The method of claim 1, wherein sending the location data collection criteria and the location data reporting criteria comprises:
   storing, by the location management server, the location data collection criteria and the location data reporting criteria in a database (DB) cluster accessible to the location management server, the location data collection criteria and the location data reporting criteria each stored in an observable data field of the DB cluster.

4. The method of claim 1, wherein receiving the location data from the first location-aware client comprises:
   observing, by the location management server, synchronization of the location data from a first local database at the first location-aware client into a database (DB) cluster accessible to the location management server.

5. The method of claim 1, wherein the location data collection criteria specifies a frequency of location data collection by the first location-aware client as a function of at least one of: time elapsed, distance traveled by the first location-aware client, velocity of the first location-aware client, acceleration of the first location-aware client, altitude of the first location-aware client, access network events of the first location-aware client, environmental sensor events of the first location-aware client, and health sensor events of the first location-aware client.

6. The method of claim 1, wherein the location data reporting criteria specifies a frequency of location data reporting by the first location-aware client as a function of at least one of: time elapsed, distance traveled by the first location-aware client, velocity of the first location-aware client, acceleration of the first location-aware client, altitude of the first location-aware client, access network events of the first location-aware client, environmental sensor events of the first location-aware client, and health sensor events of the first location-aware client.

7. The method of claim 1, wherein the location data comprises a geographic latitude and longitude of the first location-aware client, wherein the location data further comprises a timestamp of the location data, an indication of events causing the location data to be collected by the first location-aware client, network information for the first location-aware client, or a combination thereof.

8. The method of claim 1, further comprising:
   evaluating, by the location management server, the location data received from the first location-aware client to determine a current location-state of the first location-aware client with respect to a geofence, the current location-state indicating whether the first location-aware client has entered the geofence, has exited the geofence, is inside of the geofence, or is outside of the geofence; and
   performing, by the location management server, one or more actions in accordance with the current location-state of the first location-aware client.

9. The method of claim 8, wherein the one or more actions performed by the location management server comprise:
   sending, by the location management server, to each of the location-aware clients participating in the first PIT call, a notification indicating the current location-state of the first location-aware client with respect to the geofence, or a current location of the first location-aware client.

10. The method of claim 9, wherein sending the notification comprises:
    storing, by the location management server, a document indicating the notification in a database (DB) cluster accessible to the location management server, the document stored in an observable data field of the DB cluster, each of the location-aware clients synchronizing with the location management server in response to the document being stored in the observable data field.

11. The method of claim 9, wherein the geofence is a virtual boundary established with respect to an anchor point tracked by the location management server, the anchor point being one of stationary or in motion.

12. The method of claim 1, further comprising:
    receiving, by the location management server, a request from the supervisory location-aware client for the location data collected by the first location-aware client, the location data collection criteria and the location data reporting criteria sent to the first location-aware client in response to receiving the request.

13. The method of claim 12, wherein receiving the request from the supervisory location-aware client for the location data comprises:
    observing, by the location management server, synchronization of the request from a second local database at the supervisory location-aware client into a database (DB) cluster accessible to the location management server.

14. The method of claim 12, wherein the request from the supervisory location-aware client indicates at least one of the location data collection criteria and the location data reporting criteria.

15. The method of claim 12, wherein the request from the supervisory location-aware client indicates a definition of a geofence, and further indicates instructions to filter the location data from the first location-aware client according to a current location-state of the first location-aware client with respect to the geofence, the current location-state indicating whether the first location-aware client has entered the geofence, has exited the geofence, is inside of the geofence, or is outside of the geofence.

16. The method of claim 15, further comprising:
    determining, by the location management server, the current location-state of the first location-aware client with respect to the geofence; and
    executing the instructions indicated by the request from the supervisory location-aware client.

17. The method of claim 15, further comprising:
transmitting, by the location management server, the definition of the geofence and the instructions to the first location-aware client.

18. A method, by a first location-aware client, comprising:
receiving, by the first location-aware client, location data collection criteria and location data reporting criteria from a location management server;
collecting, by the first location-aware client, location data in accordance with location data collection criteria;
storing, by the first location-aware client, the location data in a first local database at the first location-aware client;
reporting, by the first location-aware client, at least a portion of the location data to the location management server in accordance with the location data reporting criteria; and
modifying, by the first location-aware client, the location data reporting criteria in response to participation by the first location-aware client in a first push-to-talk (PTT) call.

19. The method of claim 18, further comprising:
receiving, by the first location-aware client, a definition of a geofence, the geofence being a virtual boundary established with respect to an anchor point; and
determining, by the first location-aware client, a current location-state of the first location-aware client with respect to the geofence by evaluating the location data collected by the first location-aware client, the current location-state indicating whether the first location-aware client has entered the geofence, has exited the geofence, is inside of the geofence, or is outside of the geofence.

20. The method of claim 19, further comprising:
receiving, by the first location-aware client, a set of instructions from the location management server, each of the set of instructions associated with a predetermined location-state; and
executing, by the first location-aware client, an instruction of the set of instructions in response to the predetermined location-state of the instruction corresponding to the current location-state of the first location-aware client, after collecting the location data.

21. The method of claim 20, wherein the set of instructions includes a directive to report the current location-state of the first location-aware client to the location management server.

22. The method of claim 20, wherein the set of instructions includes a directive to report at least a portion of the location data in accordance with the location data reporting criteria.

23. The method of claim 20, wherein the set of instructions includes a directive to perform one or more actions, the one or more actions including one of sending a message to the location management server, and invoking a service at the first location-aware client.

24. The method of claim 20, wherein receiving the set of instructions from the location management server comprises:
observing, by the first location-aware client, synchronization of the set of instructions from a DB cluster accessible to the location management server into the first local database.

25. The method of claim 20, wherein receiving the set of instructions from the location management server comprises:
receiving, by the first location-aware client, a multicast transmission including the set of instructions.

26. The method of claim 25, wherein the multicast transmission is an Evolved Multimedia Broadcast Multicast Services (eMBMS) transmission.

27. The method of claim 19, wherein receiving the definition of the geofence comprises:
observing, by the first location-aware client, synchronization of the definition of the geofence from a DB cluster accessible to the location management server into the first local database.

28. The method of claim 19, wherein receiving the location data collection criteria and the location data reporting criteria from the location management server comprises:
observing, by the first location-aware client, synchronization of the location data collection criteria and the location data reporting criteria from a DB cluster accessible to the location management server into the first local database.

29. The method of claim 19, wherein receiving the location data collection criteria and the location data reporting criteria from the location management server comprises:
receiving, by the first location-aware client, a multicast transmission including the location data collection criteria and the location data reporting criteria.

30. The method of claim 29, wherein the multicast transmission is an Evolved Multimedia Broadcast Multicast Services (eMBMS) transmission.

31. The method of claim 19, further comprising:
receiving, by the first location-aware client, an update for the definition of the geofence.

32. The method of claim 31, wherein the update for the definition of the geofence comprises a change in location coordinates of the anchor point, shape of the geofence, size of the geofence, or a combination thereof.

33. The method of claim 19, wherein the anchor point of the geofence is static.

34. The method of claim 19, wherein the anchor point of the geofence is in motion.

35. The method of claim 19, wherein the geofence is a two-dimensional shape.

36. The method of claim 19, wherein the geofence is a three-dimensional shape.

37. A location management server comprising:
a processor; and
a computer readable storage medium storing programming for execution by the processor, the programming including instructions for:
receiving a request from a supervisory location-aware client of a plurality of location-aware clients, each of the location-aware clients participating in a first push-to-talk (PTT) call;
sending location data collection criteria and location data reporting criteria to a first location-aware client of the location-aware clients;
receiving location data from the first location-aware client, the location data collected by the first location-aware client according to the location data collection criteria, the location data received from the first location-aware client according to the location data reporting criteria; and
modifying the PTT call according to the received location data.

38. The location management server of claim 37, wherein the programming further includes instructions for:
evaluating the location data to determine a current location-state of the first location-aware client with respect to a geofence; and performing an action according to the current location-state of the first location-aware client.

39. The location management server of claim 37, wherein the programming further includes instructions for:
indicating a definition of a geofence and instructions to the first location-aware client, the instructions executed by the first location-aware client in response to determining a current location-state of the first location-aware client with respect to the geofence.

40. The location management server of claim 37, wherein the instruction for sending the location data collection criteria and the location data reporting criteria comprises instructions for:
transmitting a multicast transmission indicating the location data collection criteria and the location data reporting criteria to each of the location-aware clients participating in the first PTT call.

41. The location management server of claim 37, wherein the instruction for sending the location data collection criteria and the location data reporting criteria comprises instructions for:
storing, by the location management server, a document indicating the location data collection criteria and the location data reporting criteria in a database (DB) cluster accessible to the location management server, the document stored in an observable data field of the DB cluster, the first location-aware client synchronizing with the location management server in response to the document being stored in the observable data field.

42. A first location-aware client comprising:
a processor; and
a computer readable storage medium storing programming for execution by the processor, the programming including instructions for:
receiving location data collection criteria and location data reporting criteria from a location management server;
collecting location data in accordance with location data collection criteria;
storing the location data in a first local database at the first location-aware client;
reporting at least a portion of the location data to the location management server in accordance with the location data reporting criteria; and
modifying the location data reporting criteria in response to participation by the first location-aware client in a first push-to-talk (PTT) call.

43. The first location-aware client of claim 42, wherein the programming includes further instructions for:
receiving a definition of a geofence definition and instructions corresponding to a current location-state of the first location-aware client; and
executing the instructions in response to determining the current location-state of the first location-aware client, the current location-state determined by evaluating the location data.

44. The location management server of claim 37, wherein the programming further includes instructions for:
receiving a request from the supervisory location-aware client for the location data collected by the first location-aware client, the location data collection criteria and the location data reporting criteria sent to the first location-aware client in response to receiving the request, wherein the request from the supervisory location-aware client indicates a definition of a geofence, and further indicates instructions to filter the location data from the first location-aware client according to a current location-state of the first location-aware client with respect to the geofence, the current location-state indicating whether the first location-aware client has entered the geofence, has exited the geofence, is inside of the geofence, or is outside of the geofence.

* * * * *